G. F. HELSON.
WRAPPING MACHINE.
APPLICATION FILED AUG. 9, 1917.
1,263,242.
Patented Apr. 16, 1918.
2 SHEETS—SHEET 2.
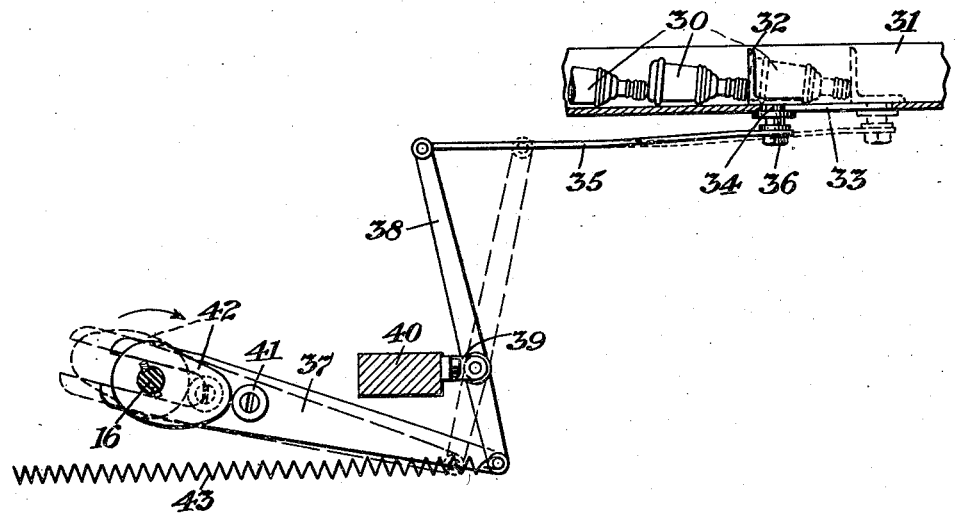
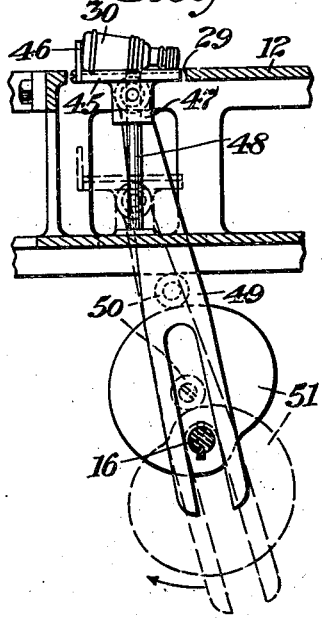

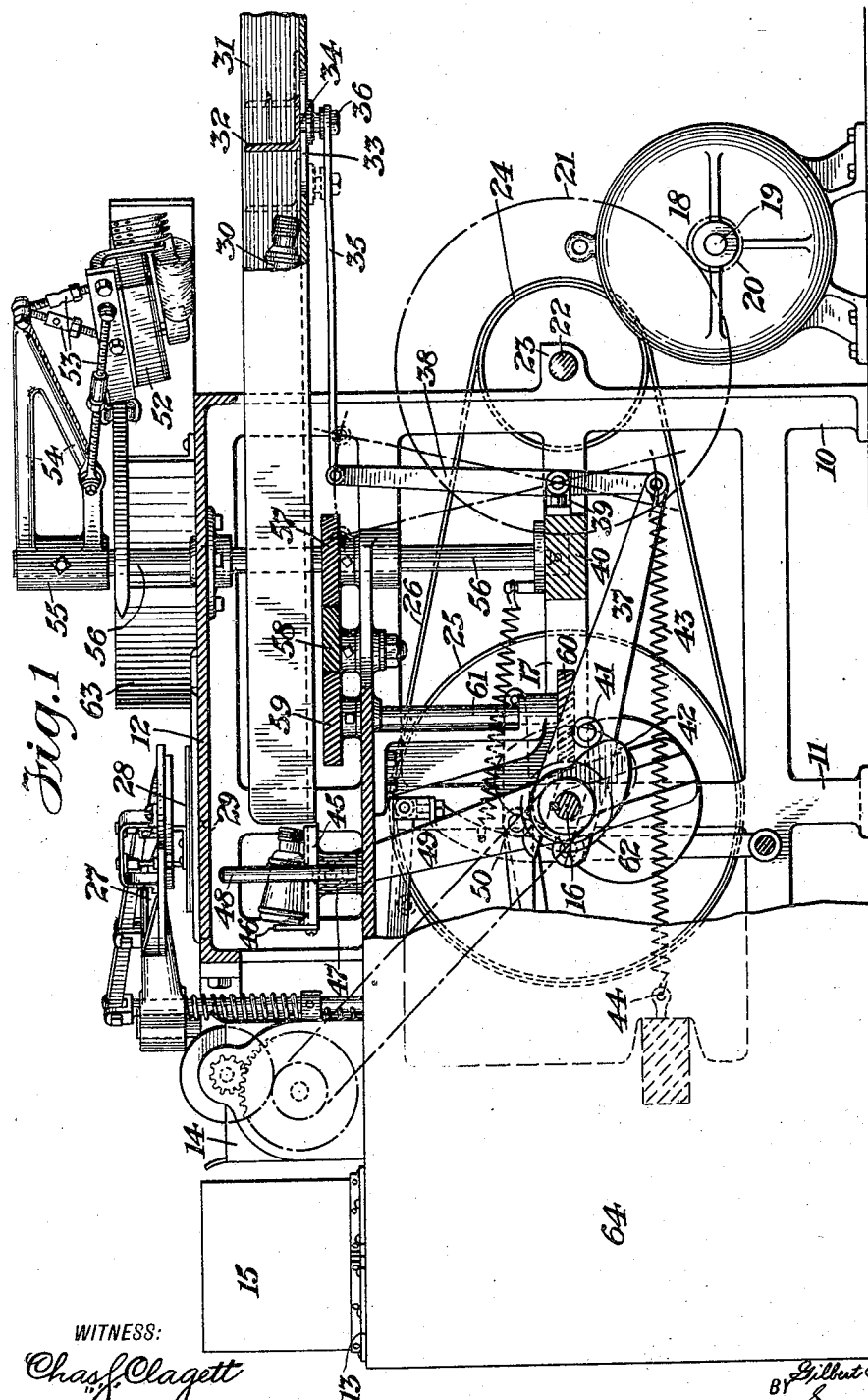

UNITED STATES PATENT OFFICE.

GILBERT F. HELSON, OF NEW YORK, N. Y., ASSIGNOR TO E. R. DURKEE AND COMPANY, OF NEW YORK, N. Y., A FIRM.

WRAPPING-MACHINE.

1,263,242.  Specification of Letters Patent.  Patented Apr. 16, 1918.

Original application filed February 28, 1917, Serial No. 151,397. Divided and this application filed August 9, 1917. Serial No. 185,276.

*To all whom it may concern:*

Be it known that I, GILBERT F. HELSON, a subject of the King of Great Britain, but having declared my intentions of becoming a citizen of the United States, residing at the borough of Richmond, in the county of Richmond, city and State of New York, have invented an Improvement in Wrapping-Machines, of which the following is a specification.

This application is a division of my application filed February 28, 1917, Serial No. 151,397, which relates to machines for placing wrappers upon bottles, cans, or other cylindrical articles, and the subject matter of the present application relates to the mechanism for feeding the articles to the machine and elevating them one at a time to the bed of the machine to receive the wrappers. I prefer to employ, and have shown the mechanism forming the subject matter of my said earlier application, for depositing the wrappers upon the bed, and I also prefer to employ, and have illustrated a wrapping block such as shown and described in another divisional application filed by me August 9, 1917, Serial No. 185,275.

In the accompanying drawings:

Figure 1, is a side elevation, partly in section, of a wrapping machine, showing my improved feeding and elevating mechanism connected therewith.

Fig. 2 is a detail view of the bottle feeding mechanism, and

Fig. 3 is a detail view of the bottle elevating mechanism.

Similar reference numerals denote like parts throughout the several views.

In the preferred form of machine, and as shown, the frame is approximately rectangular and comprises a plurality of uprights such as 10 and 11, the top being stepped, forming a main bed 12, extending longitudinally the full length of the frame at its front, and a lower bed 13, at the rear, upon which are supported a paste or glue box 14, and a feed box or holder 15, for the wrappers.

16, indicates the main shaft which is journaled at its respective ends in cross beams 17. 18, designates the motor, upon the shaft 19, of which is secured a gear 20, meshing with gear 21, fixed to a shaft 22, journaled in bearings in a bracket 23 fixed to the frame at the front of the machine in line with the main shaft.

Fixed to the shaft 22, at one side of the gear 21, is a pulley 24. 25, indicates a pulley fixed to the main shaft 16, adjacent one end. 26, denotes the drive belt which passes around the pulleys 24 and 25.

There is an opening 29, in the main bed 12, of the machine, adjacent which the wrappers are deposited one at a time by suitable means, preferably by a carrier 27, and release plate 28, as shown.

A plurality of bottles 30, which are to be covered by the wrappers, are arranged in a row within the feed chute 31, the bottles being placed upon their sides, bottoms foremost, the top of one bottle contacting with the bottom of the next bottle. The bottles are pushed toward the open end of the chute 31 under the bed 12, the length of one bottle at a time by the pusher 32 which is in the form of an angle piece arranged within that part of the chute extending outside the frame of the machine. There is a longitudinal slot 33 in the bottom of the chute at this point through which extends a lug 34 secured to the under side of the horizontal member of the pusher. This lug is connected in any suitable manner with a horizontally arranged connection rod 35. I prefer to provide the end of the lug with a screw thread which extends through a hole in the rod 35, a nut 36 being screwed upon the extending end of the lug to secure the same to the rod. The slot 33 is of a length to allow the pusher 32 to make a forward and backward movement equal to the length of one bottle. This movement is effected by the means next described. 37 is an arm, bifurcated at one end which straddles the main shaft 16. The other end of this arm 37 is pivotally connected to one end of a lever 38 fulcrumed upon a bifurcated lug 39 secured to the cross beam 40. The other end of the lever 38 is pivotally connected to one end of the rod 35. A roller 41 is attached to the arm 37 on one side. 42 indicates a cam keyed to the main shaft 16 and contacting with the roller 41 on the arm 37. When the pusher 32 reaches its extreme forward movement, the enlarged periphery of the cam 42 passes the roller 41 on the arm 37 which causes the pusher to slide back to the opposite end of the slot 33 in the chute 31 by the contraction of the spiral spring 43 one end of which is attached to the lower end of the lever 38 its other end being connected to the frame of the machine as at 44. When the pusher reaches this extreme backward movement, the operator places another bottle in the feed chute 31 immediately in front of the pusher to fill the space left by the bottle last delivered upon the elevator bed 45. The construction and operation of the pusher mechanism is illustrated in detail in Fig. 2. When one of the bottles 30 is pushed out of the open end of the feed chute 31 as hereinbefore described it is deposited upon the bed 45 forming the top member of the elevating mechanism next described. The bed 45 is preferably provided with a shallow longitudinal groove on its upper surface into which the bottle is received and there is also preferably a stop 46 at one end of the bed to arrest the movement of the bottle as it is forced out of the chute upon the bed. The bed 45 is secured upon a block 47 in opposite sides of which are vertical openings through which extend vertical guide pins 48 secured at their lower ends to a cross beam of the frame to steady and guide the up and down movement of the bed and block. 49 indicates an arm bifurcated at its lower end which straddles the main shaft 16. The upper end of this arm is pivotally connected to the block 47. Upon one side of the arm 49 at or about its center, there is attached a roller 50. 51 designates a cam keyed upon the main shaft 16 and contacting with the roller 50. At the moment a bottle is pushed from the open end of the feed chute 31 on to the bed 45 of the elevator, it is raised to a level with the upper surface of the bed 12 by the cam acting upon the roller 50 raising the arm 49 and pushing up the bed 45 with the bottle resting upon it; the extreme upward movement of the bed bringing it within the opening 29 in the bed 12. The details of this mechanism is best illustrated in Fig 3.

When the bottle arrives at a level with the bed, as just described, it is in position to receive a wrapper which has been deposited upon the bed 12, adjacent the opening 29, by any suitable means, but preferably by the carrier 27, and release plate 28, shown, and before referred to as forming the subject matter of my original application Serial No. 151,397. The wrapper may be applied to the bottle by any suitable means, but I prefer to employ the wrapping-block 52, shown and before referred to as forming the subject matter of my copending divisional application, Serial No. 185,275. That portion of the machine below the bed 13 is preferably covered by a shield 64, to protect the operator from contact with the moving parts, and to exclude dust or other foreign matter.

I claim as my invention:

1. In a wrapping machine, in combination, a frame and bed supported thereon provided with an opening, a bottle holding block located below the bed and provided with openings in its opposite sides, vertical guide pins secured to the frame and extending through said openings in the block, a drive shaft, an arm having a bifurcated lower end straddling said shaft and jointedly secured at its upper end to said block, a roller attached to said arm, and a cam keyed to the drive shaft and contacting with said roller by means of which said block is raised into said opening in the bed.

2. In a wrapping machine, in combination, a frame and bed supported thereby provided with an opening, a chute for holding the articles to be wrapped, a pusher within said chute, a drive shaft, an arm having a bifurcated end straddling such shaft, a lug secured to a cross beam of the frame, a lever fulcrumed therein, the other end of said arm being pivotally connected to one end of said lever, a rod pivotally connected at one end to said pusher and at its other end to said lever, a roller secured to said arm, a cam keyed to the drive shaft and contacting with said roller by means of which the pusher is given a limited forward movement, a spring for drawing the pusher back, an elevator block adjacent one end of said chute upon which the articles are deposited one at a time from said chute, said block being provided with openings in its opposite sides, vertical guide pins secured to the frame and extending through said openings, an arm having a bifurcated lower end straddling the drive shaft and pivotally secured at its upper end to said block, a roller attached to said arm, and a second cam keyed to the drive shaft and contacting with said roller by means of which said block is raised into said opening in the bed.

Signed by me this 1st day of August, 1917.

GILBERT F. HELSON.

Copies of this patent may be obtained for five cents each, by addressing the "Commissioner of Patents, Washington, D. C."